2 Sheets—Sheet 1.
G. E. HARRIS.
VEHICLE SPRING.
No. 9,975. Reissued Dec. 20, 1881.
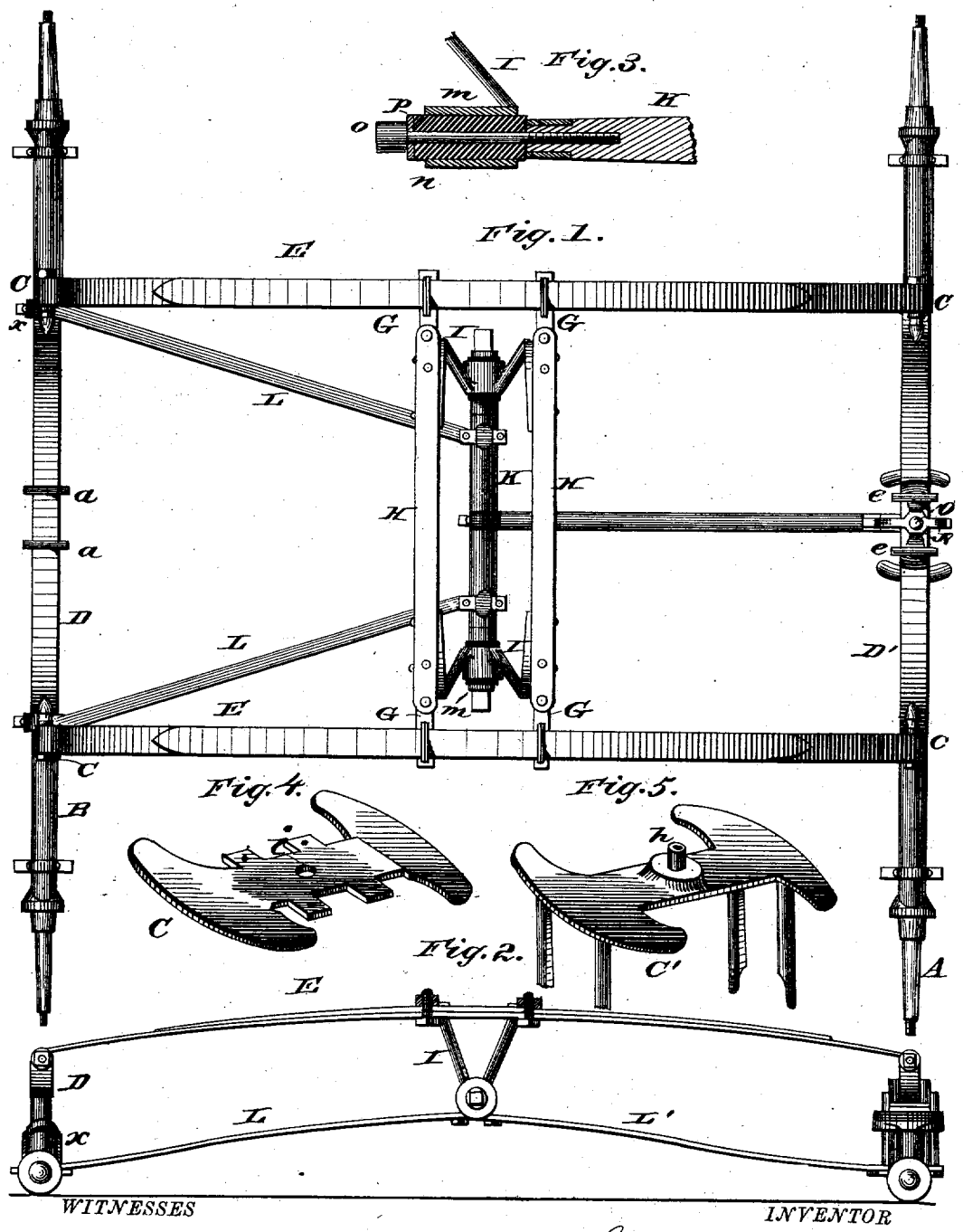
WITNESSES
Fred. G. Dieterich.
F. C. Dieterich.
INVENTOR
George E. Harris
by C. A. Snow and Co.
Attorneys
N. PETERS, Photo-Lithographer, Washington, D. C.

2 Sheets—Sheet 2.

G. E. HARRIS.

VEHICLE SPRING.

No. 9,975. Reissued Dec. 20, 1881.

WITNESSES

Fred. L. Dieterich.
J. W. Stockett.

INVENTOR

George E. Harris,
by C. A. Brown & Co.
Attorneys

N. PETERS, Photo-Lithographer, Washington, D. C.

UNITED STATES PATENT OFFICE.

GEORGE E. HARRIS, OF LAWRENCEVILLE, PENNSYLVANIA.

VEHICLE-SPRING.

SPECIFICATION forming part of Reissued Letters Patent No. 9,975, dated December 20, 1881.

Original No. 234,403, dated November 16, 1880. Application for reissue filed November 7, 1881.

*To all whom it may concern:*

Be it known that I, GEORGE E. HARRIS, of Lawrenceville, in the county of Tioga and State of Pennsylvania, have invented certain new and useful Improvements in Vehicle-Springs; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to that class of vehicles in which the body is supported upon side springs, secured at their extremities to end springs mounted upon and secured to the front and hind axles, and has for its object to provide improved means for supporting said body, bracing the springs, and preventing noise and rattling of parts.

Figure 6:
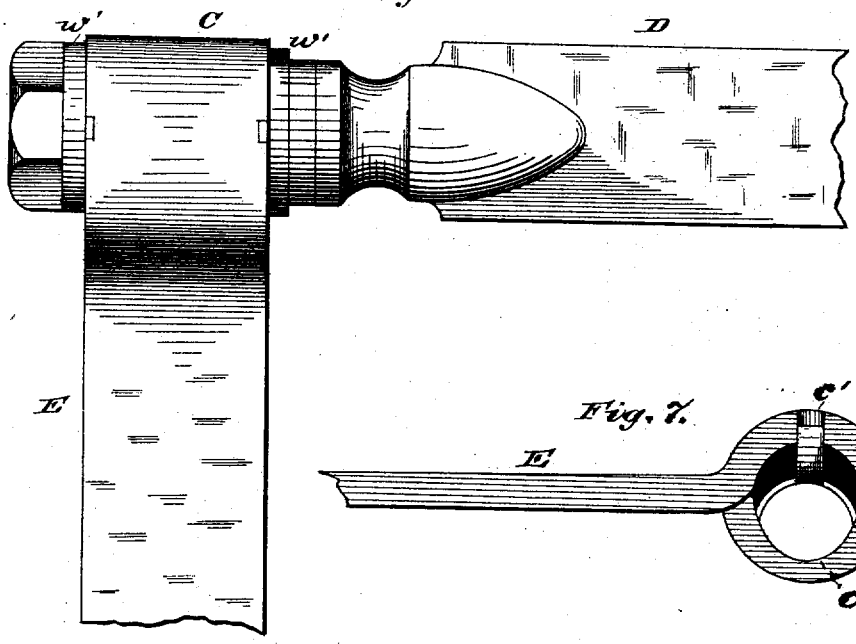
Figure 7:
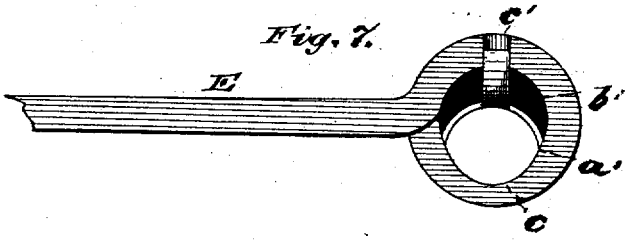
Figure 8:
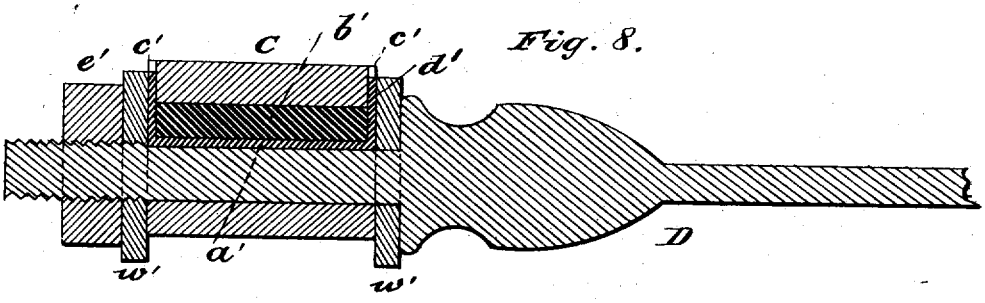

In the drawings, Figure 1 is a plan view of the parts to which my improvements relate. Fig. 2 is a side view thereof, and Figs. 3, 4, 5, 6, 7, and 8 are detail views.

Corresponding parts in the several figures are denoted by like letters of reference.

E E are the side springs, which are connected with the end springs, D D′, by means of eyes or thimbles *c c*, fitting over the rounded ends or spindles of the latter and secured thereon by nuts or pins. Attached to said side springs, near their middle portions, are iron body-supports G G, with which the body is connected, it being secured to wooden bars or blocks H H, placed transversely and secured to said supports. The bars or body-supports G G are connected with the side springs by means of shackles or yokes.

To the ends of the transverse bars H are secured depending brackets I, formed at their lower ends with thimbles *m*, within which are placed perforated blocks *n*, of rubber or similar elastic packing material, of sufficient length to project at each end.

A transverse bar, K, mounted between the thimbles, is held by means of threaded bolts *o*, passing through the packing-blocks and into the ends of the bar. Between the heads of the bolts and the packing-blocks *n* are placed washers *p*. Upon screwing up the bolts *o* a projecting rim of packing material will be forced out at each end of the thimble *m*, so as to form elastic cushions between the latter and the ends of the equalizing-bar and the washers at the heads of the bolts, completely isolating said thimbles from contact with either metal or wood surfaces.

The hind spring, D, is firmly bolted or clipped to the hind axle at *a a*, and the front spring, D′, at *e e*, to the block or plate C, (shown in Fig. 4,) composing the head-block or upper part of the fifth-wheel.

Firmly connected with the bar K by means of clips are steel braces L L, extending backward, and secured rigidly to the rear axle, B, at their hind ends. A similar brace, L′, is extended forward to the front axle. These braces serve as a reach.

Braces L L, which, as also brace L′, may be flat, round, or of other suitable shape, are firmly connected by their bolts or clips with the rear axle, B, at points below the ends of spring D, and with the bar K at points intermediate to its middle and ends.

Brace L′, which may consist either of one bar connected with the middle of the transverse bar K or of two bars connected at different points, and extended forward in V-shape, extends forward under the central portion of the front axle, A, to which it is secured by the king-bolt O passing through it and the yoke N, which extends over the top of the front spring, D′, and has depending arms passing through holes in brace L′ in front and rear of the front axle. Nuts on the arms of the yoke above and below the brace L′ firmly secure the latter.

The brackets I, secured to the bars H, extend downward from the centers of springs E E to substantially the same distance below them as exists between the ends of the side springs and the rear ends of braces L L and the forward end of brace L′. Consequently the braces follow a line substantially parallel with the line of curve of the side springs. By this construction I provide an effective connection, capable of holding the front and rear axles and end springs in proper vertical position, and of preventing the springs from unequally settling under a load.

The braces yield to accommodate any elongation of springs E E caused by straightening out when supporting a load, for, being bent to substantially the same extent as springs E E, and connected rigidly at their inner ends to the middle portions of the springs, so that they are depressed at that point and straightened out correspondingly with the springs, the braces straighten and bend to the same degree as the springs. By this means the proper vertical position and parallelism of the front and rear axles and end springs are maintained, and an elastic or yielding movement is permitted in the axles and end springs. An easy-going vehicle is thereby provided, jolting and jarring, caused by passing over irregularities in the road, being obviated. The springs yield when the vehicle strikes a stone or the side of a rut, and thereby the wheels, instead of shaking and jarring the vehicle by striking rigidly, are drawn or pulled gradually over or out without shock. There is no play between the ends of the braces and the bar K or axles, the connections being made perfectly rigid. This does not interfere, however, with the necessary yielding movements of the side springs, for the resiliency of the braces readily accommodates the movements of the springs. In this respect I believe my construction presents features of advantage over all similar existing arrangements.

In all the constructions of carriage running-gear with which I am familiar having coupling-braces connected with the axles and side springs the braces are attached by hinge or pivot joints to the other parts. This is open to several objections—among others, liability to wear and rattle and danger of breakage. These I seek to remove.

To still further provide for securing a side-spring conveyance which shall be exempt from the rumbling and roaring sounds so troublesome in vehicles, I secure against any looseness or rattling of cross-bar K and arms I by means of the thimbles *m* and packing-blocks *n*, having their cushioning ends projecting from the thimbles, as previously described. The rubber or other packing, being a non-conductor of sound, will absorb the vibrations of the wheels and lower parts of the gearing, and thereby prevent them from reaching the body. Troublesome rumbling and roaring, very frequently experienced, due to the sounding-board-like action of the body, are thereby prevented. By permitting no actual contact of metallic or hard surfaces wear of parts and noise due to their vibration and contact are also prevented.

The fifth-wheel is composed of a lower plate, C′, (shown in Fig. 5,) secured to the front axle, and an upper plate or block, C, attached to the front spring, D′. Part C′ is formed with suitable bearing-surfaces for the upper plate, and has a vertical perforated stud or nipple, *h*, which is adapted to project upward through a hole, *i*, in plate C, and thus serves as a pivot for the latter. The king-bolt O passes through the nipple *h* and is relieved of all strain.

To provide a connection for the ends of the side and end springs that will fit tightly in use and not become loose by wear, I construct the eyes or thimbles on the ends of the side springs with enlarged apertures of an elliptical form. Within the aperture of each thimble, and in the upper portion thereof, I place a concave block or plate of metal, *a′*, whose face, in connection with the lower portion of the thimble, forms a circular bearing for the spindle at the extremity of the end spring.

Upwardly-projecting ears *d′* of the bearing-plates are received in grooves *c′* in the ends of the thimble, and maintain the bearing-plates in position. Above the bearing-plate is a packing-block, *b′*, the expansion of which presses the plate downward firmly upon the spindle of the end spring, holding the same tightly and forming a tight bearing not liable to rattle. The compression of the packing-block when the wagon receives its load, although slight, gives an easy yielding movement, while the expansibility of the packing keeps the bearing-plate closely pressed against the spindle at all times, and compensates for any wear. Elastic washers *w′* are placed on each side of the thimble, and the whole is tightened up by means of the nut *e′*. The elastic washers and packing in this case also perform the function of absorbing vibrations and noise.

Having thus described my invention, I claim and desire to secure by Letters Patent of the United States—

1. In a vehicle running-gear having the side springs and end springs arranged substantially as described, the braces L L and L′, connected rigidly to the front and rear axles and to the central transverse equalizing-bar, substantially as set forth.

2. In a vehicle running-gear, the side springs having depending brackets I, supporting the transverse equalizing-bar K, the end springs connected to the side springs and supported upon the axles, and the braces L L L′, rigidly connected to the equalizing-bar and axles, substantially as set forth.

3. In a vehicle running-gear, the reach formed by elastic braces rigidly connected to the axles and to a central transverse equalizing-bar, substantially as set forth.

4. The combination, with axles A B, end springs, D D′, and side springs, E E, of supports G, bars H, brackets I, equalizing-bar K, and braces L L and L′, substantially as described.

5. The thimbles *m*, having perforated packing-blocks projecting at each end of said thimbles, so as to form elastic cushions between the said thimbles and the ends of the equalizing-bar and heads of the securing-bolts, substantially as described.

6. The combination, with the axles and side springs connected thereto, of the brackets depending from the middle of said springs, the equalizing-bar supported thereby, and the front and rear braces having rigid connections with the axles and equalizing-bar, substantially as and for the purposes described.

7. The side springs having elliptical eyes or apertures provided with concave blocks or plates, and packing-cushions to form bearings for the spindles of the end springs, substantially as set forth.

8. The side springs having thimbles provided with grooves $c'$ and elliptical apertures, concave bearing-plate $a'$, having ears $d'$, and packing-cushions to form bearings for the spindles of the end springs, substantially as described.

In testimony that I claim the foregoing I have hereunto set my hand this 26th day of October, 1881.

GEORGE E. HARRIS.

Witnesses:
J. R. LITTELL,
C. K. ALLEN.